United States Patent [19]

Liebing

[11] 4,266,431
[45] May 12, 1981

[54] GYROSCOPIC APPARATUS

[75] Inventor: Alan P. Liebing, West Linton, Scotland

[73] Assignee: Ferranti Limited, Cheadle, England

[21] Appl. No.: 100,106

[22] Filed: Dec. 4, 1979

[30] Foreign Application Priority Data

Dec. 6, 1978 [GB] United Kingdom ............... 47332/78

[51] Int. Cl.³ ..................... G01C 19/16; G01C 19/26
[52] U.S. Cl. ..................................... 74/5.1; 74/5 F; 74/5.5; 74/5.8
[58] Field of Search ..................... 74/5 F, 5.5, 5.8, 5.1; 33/402, 397, 391, 318; 308/2 A

[56] References Cited

U.S. PATENT DOCUMENTS

| | | | |
|---|---|---|---|
| 2,556,253 | 6/1951 | Blair et al. | 74/5.1 X |
| 3,002,392 | 10/1961 | Scotto | 74/5 F |
| 3,311,326 | 3/1967 | Scotto et al. | 74/5.5 X |
| 4,218,827 | 8/1980 | Huvers | 33/318 |

FOREIGN PATENT DOCUMENTS 617675 7/1978 U.S.S.R. ..................................... 33/391

*Primary Examiner*—Rodney H. Bonck
*Attorney, Agent, or Firm*—Kerkam, Stowell, Kondracki & Clarke

[57] ABSTRACT

Gyroscopic apparatus comprises a gyroscopic device having two mutually perpendicular sensitive axes. The device is suspended in a two-axis gimbal system by means of cross-spring pivots of zero stiffeners. The gimbal system is further supported by a subsidiary suspension about two horizontal axes, and the subsidiary suspension carries damping means to damp movements of the gimbal system.

11 Claims, 1 Drawing Figure

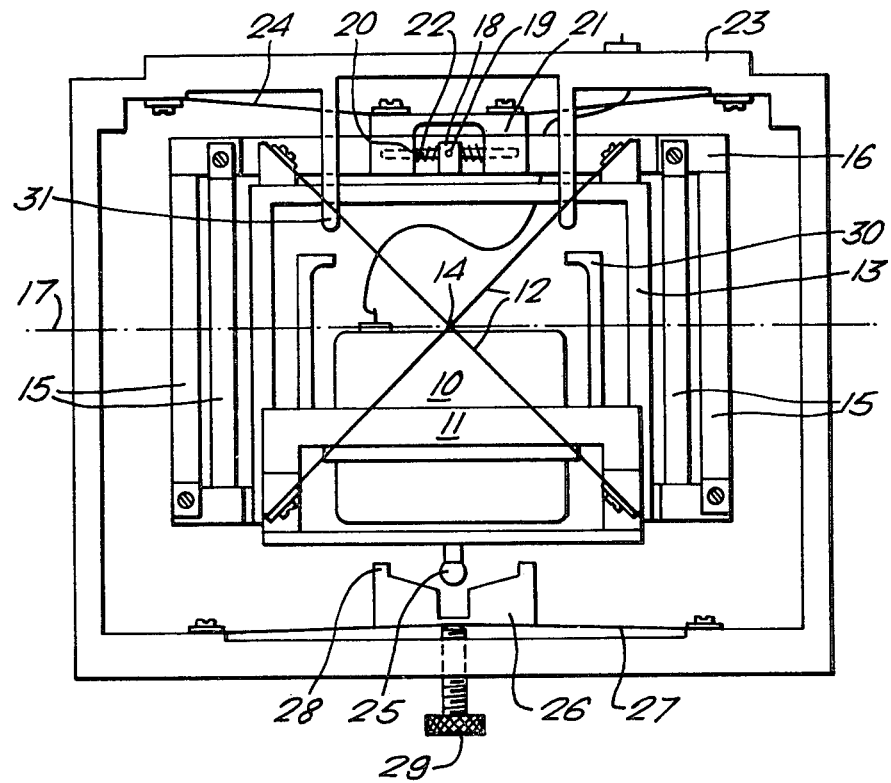

GYROSCOPIC APPARATUS

This invention relates to gyroscopic apparatus, and in particular to pendulous gyroscopes.

Pendulous gyroscopes are used in applications where it is necessary to determine accurately the direction of the Earth's polar axis, for example for survey work. In such a case it is necessary to provide a gyroscope which may be accurately aligned with the local vertical, and to maintain this alignment despite movements of the supporting structure. It is well-known to use the gyroscope as the bob of a pendulum supported by means of a tape or wire attached to the supporting structure. However, even with very slender supports a certain amount of elastic coupling to the gyroscope exists, which may cause errors. This coupling may be reduced by increasing the length of the pendulum, but this may lead to unacceptably long pendulums. It is advisable for a pendulous suspension to be damped, but a continuously-damped suspension provides coupling to the pendulum. On the other hand variable-rate damping requires complex control mechanisms.

It is an object of the invention to provide gyroscopic apparatus in the form of a pendulous gyroscope which overcomes the disadvantages referred to above.

According to the present invention there is provided gyroscopic apparatus which includes a gyroscopic device having two mutually orthogonal sensitive axes, a two-axis gimbal system supporting the gyroscopic device for movement about two orthogonal horizontal axes by means of a pair of cross-spring pivots of zero stiffness, subsidiary suspension means arranged to support the gimbal system about two axes nominally parallel to and vertically above the said two horizon axes, and damping means operable to damp movements of the gimbal system about the two axes of the subsidiary suspension means.

An embodiment of the invention will now be described with reference to the accompanying drawing.

This shows a side view of the apparatus. The gyroscopic device 10, possibly in the form of a single tuned-rotor gyroscope having two orthogonal sensitive axes, is carried in a rigid frame 11. This frame is suspended by two pairs of crossed springs 12 from an inner gimbal 13, the axis 14 of the spring suspension being nominally horizontal. The inner gimbal 13 is itself suspended by two further pairs of crossed springs 15 from an outer gimbal 16. The axis of suspension 17 of springs 15 is also nominally horizontal and orthogonal to the axis of suspension 14 of springs 12.

The stiffness of the two-axis crossed spring suspension may be adjusted by varying the loading on the suspension. It is possible, by suitable adjustment and balancing of the weights of the frame 11 and inner gimbal 13 to produce a suspension with zero stiffness.

A pendulous gyroscope requires some form of damping, since none is provided by the zero-stiffness crossed-spring suspension. This is provided by secondary pivots supporting the outer gimbal 16. This gimbal carries a pair of supports 18 for a rod 19 arranged parallel to the axis 14 of the crossed springs 12. The rod 19 carries a central block (not shown) which itself pivots about a second rod 20 arranged parallel to the axis 17 of the crossed springs 15. The rod 20 is carried by a mounting 21. Damping of any motion about the two rods 19 and 20 is provided by friction between the rods and their supports. Centralizing springs 22 are provided on the rods 19 and 20.

The plane containing the axes of the damped suspension is vertically above and parallel to that containing the axes of the crossed-spring suspension.

In order to provide a degree of shock protection in a vertical direction to the crossed-spring suspension the mounting 21 is attached to the supporting outer structure 23 by means of a number of radial leaf springs 24. In addition a clamping device is provided in the form of a ball 25 on the lower side of the frame 11 and a co-operating socket 26 carried on springs 27 fastened to the supporting outer structure 23. The socket 26 also carries end stops 28 which limit the normal pivotal movement of the pendulum. For transit purposes a screw 29 causes the socket 26 to engage the ball 25 on the frame 11, and lift the frame 11 until limit stops 30 on the frame 11 engage similar stops 31 on the supporting structure, effectively clamping the frame 11. The crossed leaf springs 12 and 15 are maintained in tension by the resilience of the leaf springs 24.

The apparatus described above thus comprises a pendulous gyroscope suspended by a zero stiffness suspension and forming a pendulum of suitable period. Although the vertical length of the suspension is very short, the effect of the rotational inertia of the gyroscope is to increase the period of the pendulum. The secondary suspension provides reasonable damping of oscillations of the pendulum, at least to that level below which the swing of the pendulum is insufficient to overcome the friction of the secondary suspension.

The apparatus described above is capable of modification in a number of different ways. The gyroscopic device need not be a two axis free-rotor gyroscope, but may, for example, comprise two single-axis gyroscopes. Other arrangements of gyroscope may also be suitable. The sensitive axes of the gyroscopic device will normally be aligned nominally horizontal, that is horizontal when the pendulum is at rest. Similarly, the cross spring suspension may readily be arranged to have other than zero stiffness. This condition depends not only on the weight of the pendulum, but also on the dimensions and the modulus of elasticity of the springs themselves.

The subsidiary suspension may take any number of forms, so long as it is possible to arrange its two axes parallel to the respective axis of the pendulum suspension, and to provide some suitable form of damping.

The clamping means described above is also capable of modification.

What we claim is:

1. Gyroscopic apparatus which includes a gyroscopic device having two mutually orthogonal sensitive axes, a two-axis gimbal system supporting the gyroscopic device for movement about two orthogonal horizontal axes by means of a pair of cross-spring pivots of zero stiffness, subsidiary suspension means arranged to support the gimbal system about two axes nominally parallel to and vertically above the said two horizontal axes, and damping means operable to damp movements of the gimbal system about the two axes of the subsidiary suspension means.

2. Apparatus as claimed in claim 1 in which the gyroscopic device comprises a two-axis free-rotor gyroscope.

3. Apparatus as claimed in either of claims 1 or 2 in which the sensitive axes of the gyroscopic device are nominally horizontal.

4. Apparatus as claimed in claim 1 in which the stiffness of the cross-spring pivots is adjustable.

5. Apparatus as claimed in claim 1 in which the subsidiary suspension includes spring means operable to absorb mechanical shocks applied along either of the axes of the suspension.

6. Apparatus as claimed in claim 5 in which the subsidiary suspension is provided with bearings which generate friction and act as the damping means.

7. Apparatus as claimed in claim 1 in which the subsidiary suspension is supported by a mounting operable to absorb mechanical shocks applied along the vertical axis.

8. Apparatus as claimed in claim 7 in which said mounting comprises two or more leaf springs each attaching the subsidiary suspension means to a support.

9. Apparatus as claimed in claim 1 which includes caging means for preventing movement of the gyroscopic device about its cross-spring pivots.

10. Apparatus as claimed in claim 9 in which the caging means includes a member having a recess arranged to engage a projection on the gimbal system.

11. Apparatus as claimed in claim 9 in which the caging means includes means for limiting the range of movement of the gyroscopic device about is cross-spring pivots.

* * * * *